United States Patent [19]

Imanaka

[11] E Patent Number: Re. 33,484

[45] Reissued Date of Patent: Dec. 11, 1990

[54] CLEANING DEVICE FOR A MONOCHROMATIC COPYING MACHINE

[75] Inventor: Yoshiaki Imanaka, Nara, Japan

[73] Assignee: Sharp Kabushiki Kaisha, Osaka, Japan

[21] Appl. No.: 311,285

[22] Filed: Feb. 15, 1989

Related U.S. Patent Documents

Reissue of:

[64] Patent No.: 4,696,565
Issued: Sep. 29, 1987
Appl. No.: 881,788
Filed: Jul. 3, 1986

[30] Foreign Application Priority Data

Jul. 5, 1985 [JP] Japan ..... 60-148792

[51] Int. Cl.[5] ..... G03G 15/08

[52] U.S. Cl. ..... 355/298; 355/299; 118/652; 430/125

[58] Field of Search ..... 355/298, 299, 296; 118/652; 430/125

[56] References Cited

U.S. PATENT DOCUMENTS

| | | | |
|---|---|---|---|
| 3,910,232 | 10/1975 | Kondo et al. | 355/326 X |
| 4,252,434 | 2/1981 | Nakamura et al. | 355/299 |
| 4,357,097 | 11/1982 | Koiso | 355/298 |
| 4,360,944 | 11/1982 | Iwai et al. | 355/298 X |
| 4,395,114 | 7/1983 | Ura et al. | 355/305 |
| 4,416,537 | 11/1983 | Gundlach | 355/300 |
| 4,428,665 | 1/1984 | Hays | 355/305 |
| 4,460,267 | 7/1984 | Ogawa | 355/251 |
| 4,520,917 | 6/1985 | Sillivent et al. | 355/299 X |
| 4,563,074 | 1/1986 | Tsutsui et al. | 355/245 |
| 4,591,258 | 5/1986 | Nishino et al. | 355/200 |
| 4,611,899 | 9/1986 | Kasamura et al. | 355/260 |
| 4,659,212 | 4/1987 | Ichihara et al. | 355/298 |

FOREIGN PATENT DOCUMENTS

| | | |
|---|---|---|
| 0008381 | 3/1980 | European Pat. Off. . |
| 0101325 | 8/1983 | European Pat. Off. . |
| 0176207 | 8/1985 | European Pat. Off. . |
| 8504733 | 10/1985 | European Pat. Off. . |
| 2952424 | 7/1980 | Fed. Rep. of Germany . |
| 3522296A | 6/1985 | Fed. Rep. of Germany . |
| 50-1741 | 1/1975 | Japan . |
| 55-101979 | 8/1980 | Japan . |
| 60-103366 | 7/1985 | Japan . |
| 2095133 | 9/1982 | United Kingdom . |

OTHER PUBLICATIONS

McCarroll, Xerox Disclosure Jrnl., vol. 10, No. 1, Jan.-/Feb., 1985, pp. 37, 38.

Hauser et al, Xerox Disclosure Jrnl., vol. 2, No. 6, Nov./Dec., 1977, p. 37.

Kinoshita, Patents Abstracts of Japan, vol. 9, No. 44, Feb. 23, 1985, p. 337.

Canon K. K.; "Image Forming Device and Developer Supplementary Container"; 60-233678; 5/7/84.

Casio Keisanki K. K.; "Image Forming Device"; 60-143360; 12/30/83.

Fuji Xerox K. K.; "Supplying and Collecting Toner Bottle"; 59-184373; 4/5/83.

*Primary Examiner*—Arthur C. Prescott

[57] ABSTRACT

A cleaning device for a monochromatic copying machine for processing residue toner removed by a blade assembly from a photoreceptor, which machine is of a type capable of accommodating selectively a plurality of developer boxes containing respective masses of toner of different colors, which device comprises a toner recovery duct extending between a cleaning box, adapted to accommodate therein residue toner removed from the photoreceptor, and a developer box, for feeding the residue toner accommodated within the cleaning box towards the developer box. One of the developer boxes for use with the mass of black-colored toner has a single chamber defined therein and communicated with the toner recovery duct when such a developer box is set in position within the copying machine, whereas each of the remaining developer boxes for use with the masses of toner of respective colors other than black has working and collecting chambers defined therein, separated by a partition wall from each other. The collecting chamber in each of the remaining developer boxes is communicated with the toner recovery duct when any one of the developer boxes is set in position within the copying machine.

4 Claims, 1 Drawing Sheet

CLEANING DEVICE FOR A MONOCHROMATIC COPYING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to an electrophotographic monochromatic copying machine capable of making a copy in one of a plurality of colors and, more particularly, to a toner cleaning device used in the copying machine.

2. Description of the Prior Art

The monochromatic copying machine referred to above is known as a copying machine capable of making a copy in one of a plurality of colors by the selective replacement of developer tanks containing toner powders of respective different colors, for example, black, red, yellow, and blue toner powders. The currently widely used copying machine capable of making a copy only in one color, for example, black color, is so designed that a quantity of residue toner removed by a blade from a photosensitive drum is recovered into the developer tank for reuse without being disposed as a waste toner. However, in the monochromatic copying machine to which the present invention pertains, no system of recovering the used toner into the developer tank is employed and the residue toner powder is disposed of into a recovery box as a waste toner, with a view to avoiding any possible mixing of a toner powder of one color with that of another and different color.

While the inclusion of even the slightest quantity of black-colored toner into a developer tank containing a mass of toner powder of color other than black results in a noticeable change in tone of the resultant copy made with the use of the toner powder of color other than black, the inclusion of a quantity of colored toner into a developer tank containing a mass of black-colored toner powder would not substantially affect the tone of the resultant copy if the quantity of the colored toner is about 5 wt %.

SUMMARY OF THE INVENTION

Accordingly, the present invention has for its essential object to provide an apparatus operable to recover the used toner into the developer tank when and so long as the black-colored toner is used for the actual copy-making, but operable to dispose the used toner, cleaned from the photosensitive drum, into a recovery box when and so long as the colored toner other than black is used for the actual copy-making.

In order to accomplish this object of the present invention, the copying machine is provided with a toner recovery duct communicated at one end with the cleaning box for accommodating the residue toner removed from the photoreceptor drum and extending towards the developer unit. The other end of the toner recovery duct extending from the cleaning box is adapted to be selectively communicated with a chamber within the developer box for use with the black-colored toner and a collecting chamber defined in a developer box for use with toner of different color other than black.

Therefore, when the copying machine is operated with the black-colored toner, the residue toner removed from the photoreceptor drum at the end of each cycle of a copying operation can be conveyed back towards the developer box for use with the black-colored toner, but when the copying machine is operated with the toner of a different color other than black, the residue toner removed from the photoreceptor drum at the end of each cycle of a copying operation can be conveyed towards the developer box and collected into the collecting chamber.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION

Figure 1:
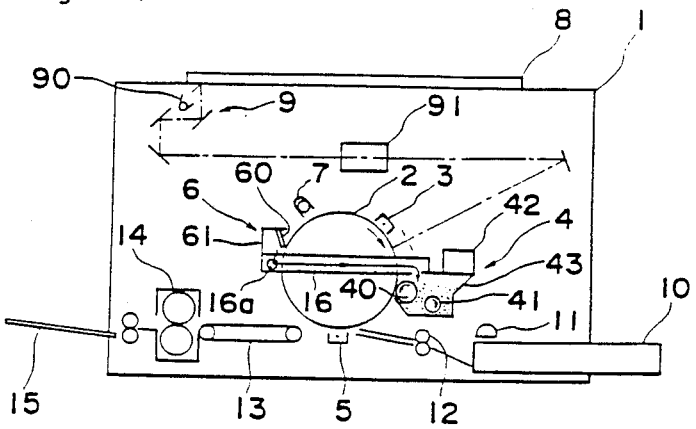
FIG. 1 is a skeleton diagram showing a copying machine embodying the present invention.

Before the description of the present invention proceeds, it is to be noted that like parts are designated by like reference numerals throughout the accompanying drawings.

Referring now to FIG. 1, there is a schematically illustrated an electrophotographic copying machine comprising a housing 1 in which a photoreceptor drum 2 is supported for rotation in one direction, as indicated by the arrow. Known processing stations where an electrostatic charger 3, a developer unit 4, a transfer charger 5, a cleaning unit 6 and an eraser lamp 7 are disposed are arranged around and in the vicinity of the outer periphery of the photoreceptor drum 2 in the specified order so that the photoreceptor drum 2 can sequentially move past these processing stations during one complete rotation thereof. The copying machine also comprises an optical system 9 including an illuminator lamp 90, a projector lens assembly 91 and several reflectors all being so arranged that an image of the original placed on an original support 8 made of a transparent plate illuminated by the illuminator lamp can be conveyed through the lens assembly 91 by way of the reflectors onto the photoreceptor drum 2, as shown by the phantom line.

A paper tray 10 accommodating a stack of copying papers is located in the vicinity of the bottom of the housing 1 and removably inserted in position partially within the housing. The copying papers in the tray 10 are fed, for example, one at a time, by a generally simicircular cross-sectioned feed roll 11 into a feed passage and are then fed onto a transfer station by a pair of PS rolls 12. At the transfer station, each copying paper so feed receives a powder image transferred from the photoreceptor drum 2 in any known manner, after which the copying paper with the powder image thereon is transported by means of a belt conveyor 13 onto a fixing station at which the powdered image on the copying paper is heat-fixed. The copying paper with the powdered image fixed at the fixing station in the manner as hereinabove described is subsequentially discharged onto a receiving tray 15.

In the construction described above, the cleaning unit 6 comprises a cleaning blade 60 and a cleaning box 61. The cleaning blade is of a generally strip-like configuration having a length corresponding to the length of the photoreceptor drum 2 and has one of its opposite side edges contacting under pressure with the outer peripheral surface of the photoreceptor drum 2 for scraping the residue toner remaining on the photoreceptor drum off from the photoreceptor drum 2 and into the cleaning box 61 in readiness for the next cycle of copying operation.

The developer unit 4 has a supply hopper 42 rigidly mounted thereon and also has a developer box 43 defined therein, in which box 43 is accommodated a motor-driven developing roll 40 supported for rotation in a predetermined direction and extending in parallel relationship with the photoreceptor drum 2, and a stirrer roll 41 also supported for rotation in a predetermined direction and extending in parallel relationship with the photoreceptor drum 2. This developer unit 4 is so designed that the toner supplied into the developer box 43 from the supply hopper 42 can be mixed by the stirrer roll 41 with carrier beads within the developer box 43 and the resultant mixture of toner and carrier can be applied by the developing roll 40 onto the outer peripheral surface of the photoreceptor drum 2 to develop an electrostatic latent image, formed thereon in any known manner, into the powder image.

The cleaning unit 6 and the developer unit 4 are connected with each other by means of a toner recovery duct 16 communicated at one end with the cleaning box 61 and at the other end with the developer box 43. The toner recovery duct 16 accommodates therein a screw feeder 16a disposed therein adjacent the cleaning box 61, the screw feeder 16a being operable to feed the toner within the cleaning box 61 onto the toner recovery duct 16.

Figure 2:
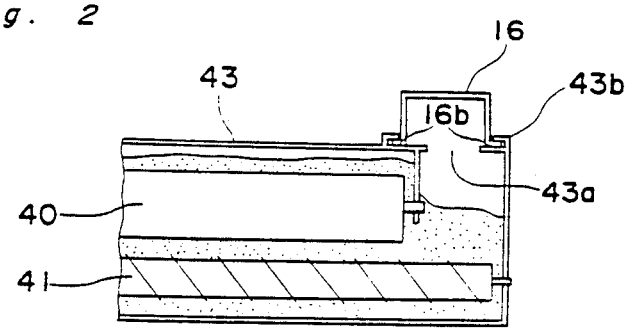
FIGS. 2 and 3 are fragmentary front sectional views of different developer boxes for use with black-colored and red-colored toner powders, respectively.
Figure 3:
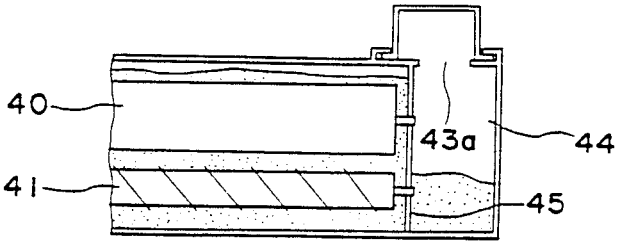

FIG. 2 illustrates the developer box for use with and accommodating the black-colored toner whereas FIG. 3 illustrates the developer box for use with and accommodating the toner of color than black, for example, the red-colored toner. Referring now to FIG. 2, both the developing roll 40 and the stirrer roll 41 are accommodated within the developer box 43 in spaced relationship with each other so that, when the developer box 43 is set in position within the copying machine housing 1, both rolls 40 and 41 can assume a parallel relationship with the longitudinal axis of the photoreceptor drum 2 while operatively coupled at one end with a drive mechanism (not shown). The developer box 43, shown in FIG. 2, has a receiving opening 43a defined at a top right end thereof which, when the developer box 43 is set in position within the housing 1, aligns with the other end of the toner recovery duct 16. The developer box 43 has a pair of spaced guide grooves defined at 43b for engagement with respective lateral flanges 16b of the toner recovery duct 16 to permit the other end of the toner recovery duct 16 to be coupled with the toner box 43 with the receiving opening 43a communicated with the interior of the toner recovery duct 16.

With the developer box 43 for use with the black-colored toner constructed as hereinbefore described, when the toner box 43 is set in position within the machine housing 1 with the receiving opening 43a thereof aligned and communicated with the toner recovery duct 16 extending from the cleaning box 61, the residue toner removed by the blade 60 from the photoreceptor drum 2 into the cleaning box 61 can be conveyed through the toner recovery duct 16 towards the receiving opening 43a and then into the developer box 43.

On the other hand, the developer box 43 for use with the red-colored toner is basically similar in structure to the developer box 43 for use with the black-colored toner, but is divided by an end partition wall 45 into two chambers, one chamber accommodating therein both of the developing and stirrer rolls 40 and 41 and the other chamber serving as a collecting box 44. The collecting box 44 is defined within the developer box 43 immediately below the receiving opening 43a and is therefore communicateable with the toner recovery duct 16 in a manner which will now be described.

Assuming that the toner box 43 is set in position within the machine housing 1 with the receiving opening 43a thereof aligned and communicated with the toner recovery duct 16 extending from the cleaning box 61, the residue toner removed by the blade 60 from the photoreceptor drum 2 into the cleaning box 61 at the end of each cycle of copying operation can be conveyed through the toner recovery duct 16 towards the receiving opening 43a and then into the collecting box 44. The toner collected within the collecting box 44 does not mix with the toner within the chamber within the toner box 43 which is separated by the end partition wall 45 from the collecting chamber 44.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A cleaning device for a monochromatic copying machine for processing residue toner removed ty a blade assembly from a photoreceptor, said copying machine being of a type capable of accommodating selectively a plurality of developer boxes containing respective mass of toner of different colors, which device comprises:

a toner recovery duct extending between a cleaning box, adapted to accommodate therein residue toner removed from the photoreceptor, and a developer box, for feeding the residue toner accommodated within the cleaning box towards the developer box, one of said developer boxes for use with the mass of black-colored toner having a single chamber defined therein, said chamber being communicated with the toner recovery duct when said developer box is set in position within said copying machine, each of the remaining developer boxes for use with masses of toner respective colors other than black having working and collecting chambers defined therein, separated by a partition wall from each other, said collecting chamber being communicated with the other recovery duct when any one of said remaining developer boxes is set in position within said copying machine.

*2. An image forming device comprising:*

*means for accommodating selectively a plurality of developer units adapted to be operated one at a time therein, a selected one of said developer units being interchangeable with another one of said developer units; and*

*toner recovery means for removing residue toner therefrom and conveying said residue toner towards a selected said developer unit operated therein;*

*each of said developer units comprising a toner reservoir for accommodating a mass of toner for developing images in said image forming device, and a residue toner collecting chamber for communicating with and receiving residue toner from said toner recovery means.*

*3. The image forming device of claim 2, wherein said mass of toner is black toner and said residue toner collecting chamber comprises said toner reservoir, whereby said residue toner is recycled for use in said image forming device.*

*4. An image forming device comprising a photoreceptor means, cleaning means for removing residue toner from said photoreceptor means and developer module means including a supply of toner for imparting said toner to said photoreceptor means to form images thereon, said developer module means being interchangeably mounted in said image forming device and comprising toner collecting chamber means detachably interconnected with said cleaning means for receiving residue toner from said cleaning means, rendering said developer module means independently detachable from the rest of said image forming device.*

* * * * *